United States Patent [19]

Yokotani et al.

[11] 3,856,911
[45] Dec. 24, 1974

[54] CHOLAGOGIC COMPOSITION CONTAINING PENTANEDIONE DERIVATIVES

[75] Inventors: Hajime Yokotani, Osaka; Masuo Miyamoto, Kyoto; Tadakazu Murata, Osaka, all of Japan

[73] Assignee: Takeda Chemical Industries, Ltd., Osaka, Japan

[22] Filed: Sept. 28, 1972

[21] Appl. No.: 293,169

Related U.S. Application Data

[62] Division of Ser. No. 56,971, July 21, 1970, Pat. No. 3,708,540.

[30] Foreign Application Priority Data

July 21, 1969   Japan................................. 44-57562

[52] U.S. Cl. ............................................... 424/331
[51] Int. Cl. ........................................... A61k 27/00
[58] Field of Search ..................................... 424/331

[56] References Cited

OTHER PUBLICATIONS

Pattison et al., J. Org. Chem., 33(3), 1,084–1,087, (1968).

Primary Examiner—Albert T. Meyers
Assistant Examiner—Daren M. Stephens
Attorney, Agent, or Firm—Wenderoth, Lind & Ponack

[57] ABSTRACT

Cholagogic composition containing as active ingredients compounds of the formula:

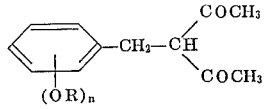

wherein R is a hydrogen atom or a lower alkyl group and $n$ is an integer of 1 to 3, and a pharmaceutical carrier therefor.

3 Claims, No Drawings

CHOLAGOGIC COMPOSITION CONTAINING PENTANEDIONE DERIVATIVES

This is a division of application Ser. No. 56,971, filed July 21, 1970, now U.S. Pat. No. 3,708,540.

This invention relates to novel 3-benzyl-2,4-pentanedione derivatives which are useful as cholagogue agents and to the production thereof. More specifically, this invention relates to novel 3-benzyl-2,4-pentanedione derivatives having the general formula (I)

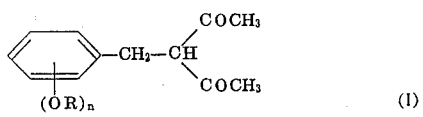

wherein R is a hydrogen atom or a lower alkyl group and $n$ is an integer of 1 to 3.

The lower alkyl group represented by R in the formula (I) is exemplified by alkyl having one to five carbon atoms such as methyl, ethyl, n-propyl, isopropyl, n-butyl, isobutyl, sec-butyl, tert-butyl, n-amyl, isoamyl, etc.. Where $n$ stands for 2 and 3, R may be the same or different.

The novel compounds (I) are produced, for instance, by subjecting a compound represented by the formula (II)

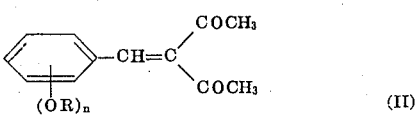

wherein R and $n$ have the same meaning as above, to hydrogenation.

As the hydrogenation process applicable to this invention there may be employed per se known processes, for example, catalytic hydrogenation or hydrogenation with zinc and acetic acid, with stannous chloride or with diborane, and among them, catalytic hydrogenation at ordinally atmospheric or superatmospheric pressure is particularly advantageous for an industrial production. The catalyst for use in such a hydrogenation process may, for example, be a platinum, palladium, sodium or nickel catalyst, among them palladium-carbon catalyst is most desirable. Usually, the catalytic hydrogenation reaction proceeds rapidly at room temperature in a suitable solvent, which may, for example, be any of alcohols such as methanol, ethanol, etc., ethers such as ethyl ether, dioxane, etc., hydrocarbons such as benzene, cyclohexane, etc., esters such as ethyl acetate etc., carboxylic acid such as acetic acid etc. and the like. These solvents may be used in any combination or as a mixed solvent with water.

From the reaction mixture thus obtained, the desired 3-benzyl-2,4-pentanedione derivatives may be isolated in conventional manner such as recrystallization, distillation and chromatography.

The starting material represented by the formula (II) is prepared, for example, by reacting a compound represented by the general formula

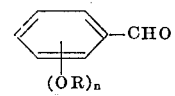

wherein R and $n$ have the same meaning as above with acetylacetone in the presence of an organic base such as pyridine and piperidine.

Pharmaceutical compositions containing one or more of the compounds of this invention can be prepared according to any per se conventional means for the preparation of tablet, powder, capsule, liquid or injection.

The compounds of this invention have an effective cholagogic activity and are generally administered orally in a form of tablet, powder, capsule, liquid, etc., or by way of injection.

A typical effective dose of the compounds of this invention, when administered orally to human adult, is usually about 0.1g to 5.0g a day, desirably 0.3g to 1.5g. a day and when administered intravenously, is usually about 0.5g. to 3.0g. per dose. Of course, an increased or reduced dose is also effective or symptoms.

The physiological activity of the compounds of this invention is demonstrated in the following tests.

Test for cholagogic activity

Each sample compound suspended with 5% gumm arabic in physiological saline was administered orally to rats (female, SD-JCL rat, weighing 200 ± 10g, which was pentobarbital anesthetized after 20 hours' fast) at the dosage of 100 mg./kg. The bile was continuously collected through a polyethylene cannula inserted into the common bile duct and its volume was measured according to the method described in "H. Yokotani; Folia Pharmacologica Japonica 56, 1373-1386 (1960)". The results are shown in Table 1.

Samples:
1. 3-(3'-methoxy-4'-hydroxybenzyl)-2,4-pentaedione
2. 3-(4'-hydroxybenzyl)-2,4-pentanedione
3. 1-phenylpropanol (produced and sold by Schering Corp. under the tradename Felicur)
4. p-hydroxyphenyl-salicylamide (produced by Yoshitomi Pharmaceutical Co. Ltd. and sold by Takeda Chemical Ind. Ltd. under the tradename Yoshichol)

Table 1

| Compound | Number of rats | Bile outflow (ml) | | * B value | ** Evaluation |
| --- | --- | --- | --- | --- | --- |
| | | $C_1$ (0-1 hr.) | Bo (1-5 hr.) | | |
| (1) | 4 | 0.94 | 4.04 | 1.03 | +++ |
| (2) | 4 | 1.00 | 4.41 | 1.21 | +++ |
| None (control) | 16 | 1.10 | 3.50 | 0 | — |

Table 1 -Continued

| Compound | Number of rats | Bile outflow (ml) | | * B value | ** Evaluation |
|---|---|---|---|---|---|
| | | C₁ (0–1 hr.) | Bo (1–5 hr.) | | |
| (3) | 6 | 0.93 | 3.85 | 0.87 | ++ |
| (4) | 6 | 1.27 | 4.58 | 0.51 | + |

* $B = Bo - b_1 C_1$
  Bo : Total outflow during 4 hours after the administration of test compounds
  $b_1$ : Ratio of bile outflow (bile volume in 1–5 hours/bile volume in 0–1 hour in the control rats)
  $C_1$ : Bile outflow during 1 hour before the administration of compounds.
** +++ : remarkably effective     $B \geq 1.0$
   ++ : fairly effective             $1.0 > B \geq 0.7$
    + : effective                   $0.7 > B \geq 0.4$
    ± : slightly effective        $0.4 > B \geq 0.3$
    − : ineffective               $0.3 > B$ Test for acute toxicity Each compound suspended with 5% gumm arabic in physiological saline was adminishtered orally to mice (female ICR-JCL mouse, 4 weeks in age, weighing 18 ± 2g.) Thus administered mice were observed for 4 days to estimate $LD_{50}$ value. The results are shown in Table 2.

Table 2

| Compound | Dose (mg./kg.) | | | | $LD_{50}$ (mg./kg.) |
|---|---|---|---|---|---|
| | 2000 | 1500 | 1000 | 500 | |
| (1) | 4/6 | 0/6 | 0/6 | 0/6 | 1500–2000 |
| (2) | — | 0/6 | 0/6 | — | >1500 |
| (3) | 6/6 | 6/6 | 0/6 | 0/6 | 1000–1500 |

Throughout the specification, "kg.," "g." and "mg." stand for "kilogram(s)," "gram(s)" and "milligram(s)," respectively.

The present invention is further explained by way of the following illustrative examples.

In the following Examples, the relationship between part(s) by weight and part(s) by volume is the same as that between gram(s) and milliliter(s).

EXAMPLE 1

In 100 parts by volume of methanol is added 4.5 parts by weight of 3-(4'-hydroxybenzylidene)-2,4-pentanedione. Under using 0.3 part by weight of palladiumcarbon as catalyst, the above mixture is subjected to catalytic hydrogenation at room temeperature (23° C) and under atmospheric pressure. After 1 hour, the reaction is complete with absorption of 540 parts by volume of hydrogen. The catalyst is filtered off, followed by washing with 80 parts by volume of methanol. The washing is combined with the filtrate. The solvent is distilled off, whereby 4.5 parts by weight of yellowish oily substance is obtained. 10 Parts by volume of benzene is added to the oily substance, and the mixture is stirred, whereby 3.6 parts by weight of 3-(4'-hydroxybenzyl)-2,4-pentanedione is obtained as crystals. The crystals are recrystallized from hot benzene to give faintly yellowish platy crystals melting at 90°–91°C.

| Elementary analysis: | | |
|---|---|---|
| Calculated for : | $C_{12}H_{14}O_3$ | |
| | C 69.98 | H 6.84 |
| Found : | C 70.09 | H 6.93 |

EXAMPLE 2

In 200 parts by volume of methanol is added 7 parts by weight of 3-(3'-methoxy-4'-hydroxybenzylidene)-2,4-pentanedione. Using 0.5 part by weight of palladium-carbon (5%), the mixture is subjected to catalytic hydrogenation under the same conditions as in Example 1. After 80 minutes, the reaction is complete with absorption of 770 parts by volume of hydrogen. The reaction mixture is filtered, and the filtrate is concentrated. To the residue is added a small amount of ethyl acetate, and the mixture is kept standing, whereby colorless crystals of 3-(3'-methoxy-4'-hydroxybenzyl)-2,4-pentanedione and obtained. After separating the crystals by filtration, the crystals are washed with 4 parts by weight of ethyl acetate. The washing is combined with the filtrate, and the mixture is concentrated, whereby additional 0.6 part by weight of crystals are obtained. Recrystallization from aqueous alcohol gives colorless platy crystals melting at 75°. C.

| Elementary analysis: | | |
|---|---|---|
| Calculated for: | $C_{13}H_{16}O_4$ | |
| | C 66.08 | H 6.83 |
| Found : | C 66.17 | H 7.00 |

EXAMPLE 3

In 100 parts by volume of methanol is added 4.3 parts by weight of 3-(4'-methoxybenzylidene)-2,4-pentanedione. Using 0.3 part by weight of palladium-carbon (5%), the mixture is subjected to catalytic hydrogenation under atmospheric pressure at room temperature for 70 minutes. The resultant is crystallized from aqueous ethanol to obtain 2.6 parts by weight of 3- (4'-methoxybenzyl)-2,4-pentanedione melting at 75°–77° C as platy crystals.

| Elementary analysis: | | |
|---|---|---|
| Calculated for; | $C_{13}H_{16}O_3$ | |
| | C 70.89 | H 7.32 |
| Found: | C 70.81 | H 7.32 |

EXAMPLE 4

In 70 parts by volume of methanol is added 3 parts by weight of 3-(3', 4',5'-trimethoxybenzylidene)-2,4-pentanedione, and then the mixture is subjected to catalytic hydrogenation under atmospheric pressure at room temperature by using 0.3 part by weight of palladiumcarbon (5%). After 90 minutes, the mixture is processed after the same manner as in Example 1. The resultant crystallized from a mixture of ethyl acetate and n-hexane, whereby 2 parts by weight of 3-(3',4',5'-trimethoxybenzyl)-2,4-pentanedione is obtained as crystal. The crystals are recrystallized from a mixture of ethyl acetate and n-hexane to obtain pure crystals melting at 86°–87° C.

|  | Elementary analysis: | |
|---|---|---|
| Calculated for; | $C_{15}H_{20}O_5$ | |
|  | C 64.27 | H 7.19 |
| Found; | C 64.16 | H 7.03 |

EXAMPLE 5

In a mixture of 50 parts by volume of acetic acid and 30 parts by volume of ethyl acetate is dissolved 10 parts by weight of 3-(3'-methoxy-4'-hydroxybenzylidene)-2,4-pentanedione under heating. To the mixture, 6 parts by weight of zinc dust is added with stirring little by little in 20 minutes at room temperature. The resultant is subjected to filtration, and the residue is washed with 30 parts by volume of ethyl acetate. The washing is combined with the filtrate. The solvent is distilled off to leave 10 parts by weight of yellowish oily substance. The yellowish oily substance is subjected to column chromatography on silica gel (50 parts by weight) with a mixture of benzene and acetone (30:1) as an eluent. The fraction corresponding to the desired 3-(3'-methoxy-4'-hydroxybenzyl)-2,4-pentanedione is collected, and the solvent is distilled off, whereby 6 parts by weight of colorless oily substance is obtained. The substance is crystallized from aqueous ethanol to obtain colorless crystals melting at 75°C. A mixed melting of thus obtained product with the product of Example 2 does not show lowering of the melting point.

EXAMPLE 6

In 100 parts by volume of a mixture of ethyl acetate and methanol (1:1) is added 5 parts by weight of 3-(2'-hydroxybenzylidene)-2,4-pentanedione. The mixture is subjected to catalytic hydrogenation at 24° C under atmospheric pressure by using platinum oxide. The reaction is finished in 1 hour. The catalyst is filtered off, and the solvent is distilled off from the filtrate, whereby 5 parts by weight of yellowish oily substance is obtained. The oily substance is subjected to column chromatography on silica gel (80 parts by weight) with a mixture of benzene and ethyl acetate (20:1) as an eluent to obtain 3.0 parts by weight of 3-(2'-hydroxybenzyl)-2,4-pentanedione as pale yellowish oil boiling at 161°–162° C(0.7mmHg).

|  | Elementary analysis: | |
|---|---|---|
| Calculated for: | $C_{12}H_{14}O_3$ | |
|  | C 69.88 | H 6.84 |
| Found; | C 69.43 | H 6.86 |

As indicated hereinbefore, the compounds of this invention can be administered in a variety of composition forms, some examples of which are as follows:

Composition 1.

|  | mg. per tablet |
|---|---|
| 1) Compound (1) | 100 |
| 2) lactose | 210 |
| 3) corn starch | 90 |
| 4) magnesium stearate | 40 |
|  | 440 |

Composition 2.

|  | mg. per tablet |
|---|---|
| 1) Compound (2) | 250 |
| 2) lactose | 280 |
| 3) corn starch | 120 |
| 4) magnesium stearate | 65 |
|  | 715 |

Composition 3.

|  | per ampoule |
|---|---|
| 1) Compound (1) | 400 mg |
| 2) propylene glycol | 6 ml |
| 3) Sterile water, sufficient to make | 10 ml |

What is claimed is:

1. A method of administering to a human in need of a cholagogic agent an effective cholagogic amount of a composition consisting essentially of, as the active ingredient, a compound of the formula:

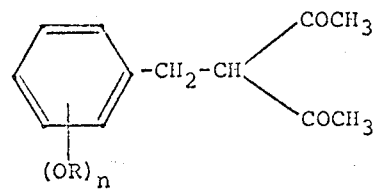

wherein R is a hydrogen atom or a lower alkyl group and $n$ is an integer of 1 to 3, and a pharmaceutical carrier therefor.

2. A method according to claim 1 wherein the active compound is 3-(3'-methoxy-4'-hydroxybenzyl)-2,4-pentanedione.

3. A method according to claim 1 wherein the active compound is 3-(4'-hydroxybenzyl)-2,4-pentanedione.

* * * * *